United States Patent
Ridray et al.

(10) Patent No.: US 11,143,141 B2
(45) Date of Patent: Oct. 12, 2021

(54) NACELLE EQUIPPED WITH A THRUST-REVERSING SYSTEM COMPRISING DOORS AND ANTI-VIBRATION SYSTEMS FOR THE DOORS IN STOWED POSITION

(71) Applicant: Airbus Operations SAS, Toulouse (FR)

(72) Inventors: Frédéric Ridray, L'Isle Jourdain (FR); Frédéric Piard, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 300 days.

(21) Appl. No.: 16/359,475

(22) Filed: Mar. 20, 2019

(65) Prior Publication Data
US 2019/0293021 A1 Sep. 26, 2019

(30) Foreign Application Priority Data

Mar. 23, 2018 (FR) ...................................... 1852541

(51) Int. Cl.
*F02K 1/72* (2006.01)
*F02K 1/76* (2006.01)
(Continued)

(52) U.S. Cl.
CPC ................ *F02K 1/72* (2013.01); *B64D 29/06* (2013.01); *F01D 25/24* (2013.01); *F02C 9/26* (2013.01);
(Continued)

(58) Field of Classification Search
CPC ..... F02K 1/70; F02K 1/72; F02K 1/60; F02K 1/605; F02K 1/62; F02K 1/625; F02K 1/766; B64D 29/06; F01D 25/24
See application file for complete search history.

(56) References Cited

U.S. PATENT DOCUMENTS

2012/0023900 A1 2/2012 Flin et al.
2012/0097261 A1* 4/2012 Porte ..................... B64D 29/08
137/15.1
(Continued)

FOREIGN PATENT DOCUMENTS

EP 2409921 A2 1/2012
EP 2447159 A2 5/2012

OTHER PUBLICATIONS

French Search Report; priority document.

*Primary Examiner* — Andrew H Nguyen
(74) *Attorney, Agent, or Firm* — Greer, Burns & Crain, Ltd.

(57) ABSTRACT

A nacelle having a window open between a secondary jet and the outside of the nacelle and comprising a fixed structure and a thrust-reversing system having a frame and outer doors articulated on the frame. The frame is translationally mobile on the fixed structure between an advanced position and a retracted position. Each outer door is mobile between a stowed position and a deployed position. The nacelle comprises at least one anti-vibration system which comprises a chock fixed to the fixed structure and having a hole, and a finger fixed to the outer door. The finger and the hole are configured so that the finger lodges in the hole when the frame is in advanced position. Such a nacelle makes it possible to limit the vibrations of the outer doors when they are in stowed position and before the mobile frame begins to be displaced to the retracted position.

10 Claims, 3 Drawing Sheets

(51) Int. Cl.
*B64D 29/06* (2006.01)
*F01D 25/24* (2006.01)
*F02C 9/26* (2006.01)

(52) U.S. Cl.
CPC .......... *F02K 1/766* (2013.01); *F05D 2220/32* (2013.01); *F05D 2240/14* (2013.01); *F05D 2270/051* (2013.01)

(56) References Cited

U.S. PATENT DOCUMENTS

2016/0281539 A1\* 9/2016 Linde .................... B64D 29/08
2016/0341149 A1 11/2016 Suciu et al.
2017/0167439 A1 6/2017 Crawford \* cited by examiner

NACELLE EQUIPPED WITH A THRUST-REVERSING SYSTEM COMPRISING DOORS AND ANTI-VIBRATION SYSTEMS FOR THE DOORS IN STOWED POSITION

CROSS-REFERENCES TO RELATED APPLICATIONS

This application claims the benefit of the French patent application No. 1852541 filed on Mar. 23, 2018, the entire disclosures of which are incorporated herein by way of reference.

FIELD OF THE INVENTION

The present invention relates to a nacelle of a dual flow jet engine which is equipped with a thrust-reversing system comprising a translationally mobile assembly on which are articulated outer doors that are mobile between a stowed position and a deployed position and an anti-vibration system which blocks the doors when they are in stowed position, a dual flow jet engine comprising such a nacelle, and an aircraft comprising at least one such dual flow jet engine.

BACKGROUND OF THE INVENTION

A dual flow jet engine of the state of the art has an engine in the form of a core and a nacelle surrounding the engine. Such a dual flow jet engine equips an aircraft which has, under each wing, a pylon fixed under the wing and bearing the dual flow jet engine. The dual flow jet engine comprises, between the nacelle and the engine, a secondary jet in which flows a secondary flow.

In order to ensure a reversal of thrust of the dual flow jet engine, the nacelle is equipped with a thrust-reversing system which comprises a mobile assembly which is translationally mobile parallel to the axis of the dual flow jet engine between an advanced position and a retracted position. In retracted position, the dual flow jet engine has a window that is open between the secondary jet and the outside of the nacelle.

In order to ensure a reversal of the thrust, the thrust-reversing system also comprises doors that are articulated on the mobile assembly and which are mobile between a stowed position and a deployed position when the mobile assembly is in retracted position. The thrust-reversing system comprises, in particular, inner doors which, in deployed position, are positioned across the secondary jet in order to deflect the secondary flow outwards, and outer doors which, in deployed position, are positioned in continuity with the inner doors and towards the front in order to deflect the secondary flow towards the front of the nacelle.

In advanced position of the mobile assembly and in stowed position of the doors, the latter are subject to high pressures, and it may be that they are made to vibrate which can generate disagreeable noises, and it is therefore necessary to find a system which prevents such vibrations.

SUMMARY OF THE INVENTION

One object of the present invention is to propose a nacelle for a dual flow jet engine which is equipped with a thrust-reversing system with outer doors that are mobile between a stowed position and a deployed position and, for each outer door, at least one anti-vibration system which blocks the door in stowed position in order to avoid the vibrations.

To this end, a nacelle is proposed for a dual flow jet engine having a secondary jet, said nacelle having a window that is open between the secondary jet and the outside of the nacelle and comprising:

a fan casing, a fixed structure fixed to the fan casing, and a thrust-reversing system having a frame and outer doors articulated by a rear edge on the frame, the frame being translationally mobile on the fixed structure in a direction of translation between an advanced position in which the frame is positioned so that the outer doors are close to the fan casing and a retracted position in which the frame is positioned so that the outer doors are away from the fan casing, each outer door being mobile between a stowed position in which it blocks the window and a deployed position in which it does not block the window, the nacelle being such that, for each outer door, it comprises at least one anti-vibration system which comprises:

a chock fixed to one of the fixed structure or the outer door and having a hole whose axis is parallel to the direction of translation, a finger whose axis is parallel to the direction of translation and which is fixed to the other of the outer door or the fixed structure, and in which the finger and the hole are configured so that the finger lodges in the hole when the frame is in advanced position, so that the finger exits from the hole when the frame leaves the advanced position, and so that the finger enters into the hole when the frame goes back to the advanced position from the retracted position.

Such a nacelle makes it possible to limit the vibrations of the outer doors when they are in stowed position and before the mobile frame begins to be displaced to the retracted position.

Advantageously, the dimensions of the hole and of the finger in a radial direction of the nacelle are fitted with a sliding-type fit.

Advantageously, the hole is oblong in a globally tangential direction relative to the nacelle.

The invention also proposes a dual flow jet engine comprising an engine and a nacelle according to one of the preceding variants which surrounds the engine and defines with it a secondary jet.

The invention also proposes an aircraft comprising at least one dual flow jet engine according to the preceding variant.

BRIEF DESCRIPTION OF THE DRAWINGS

The features of the invention mentioned above, and others, will emerge more clearly on reading the following description of an exemplary embodiment, said description being given in relation to the attached drawings, in which.

DETAILED DESCRIPTION OF THE PREFERRED EMBODIMENTS

In the following description, the terms relating to a position are taken with reference to the direction of advance of an aircraft.

Figure 1:
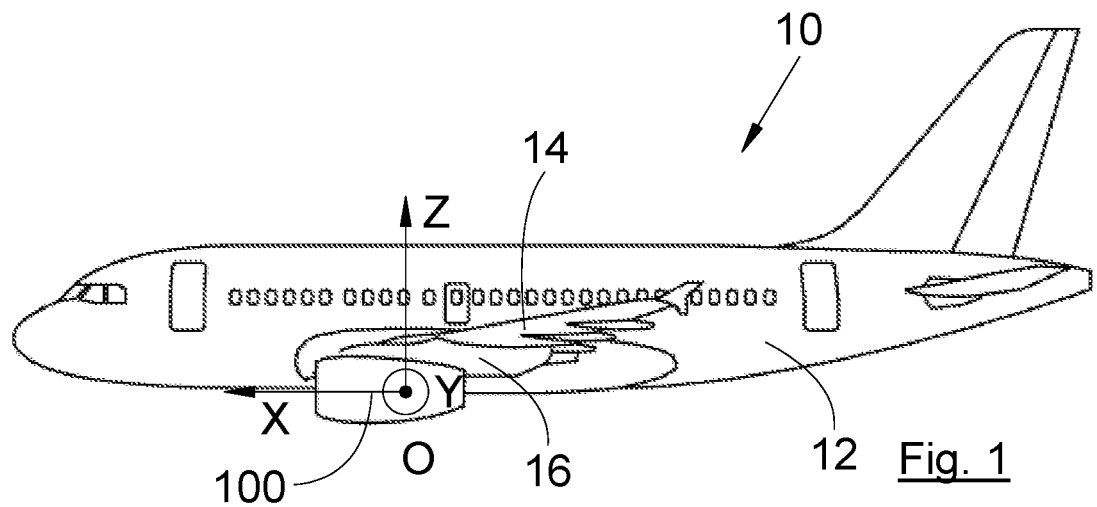
FIG. 1 is a side view of an aircraft comprising a dual flow jet engine according to the invention.

FIG. 1 shows an aircraft 10 which comprises a fuselage 12 on each side of which is fixed a wing 14 which bears at least one dual flow jet engine 100 according to the invention. The dual flow jet engine 100 is fixed under the wing 14 via a pylon 16.

In the following description, and by convention, X denotes the longitudinal axis of the dual flow jet engine 100 which is parallel to the longitudinal axis of the aircraft 10 and oriented positively towards the front of the aircraft 10, Y denotes the transverse axis which is horizontal when the aircraft 10 is on the ground, and Z denotes the vertical axis when the aircraft 10 is on the ground, these three directions X, Y and Z being mutually orthogonal.

Figure 2:
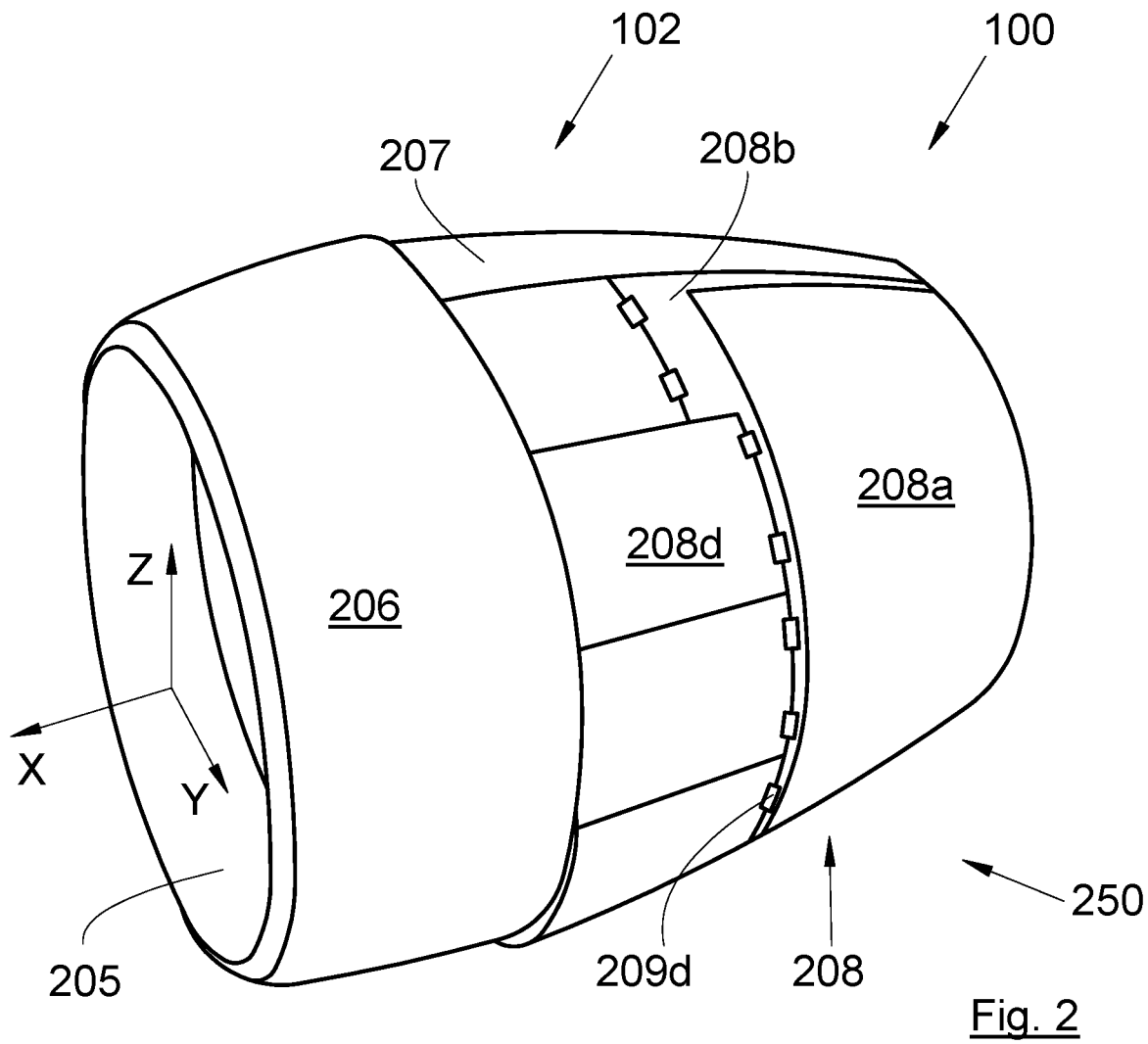
FIG. 2 is a perspective view of a dual flow jet engine according to the invention when the thrust-reversing system is not activated.
Figure 3:
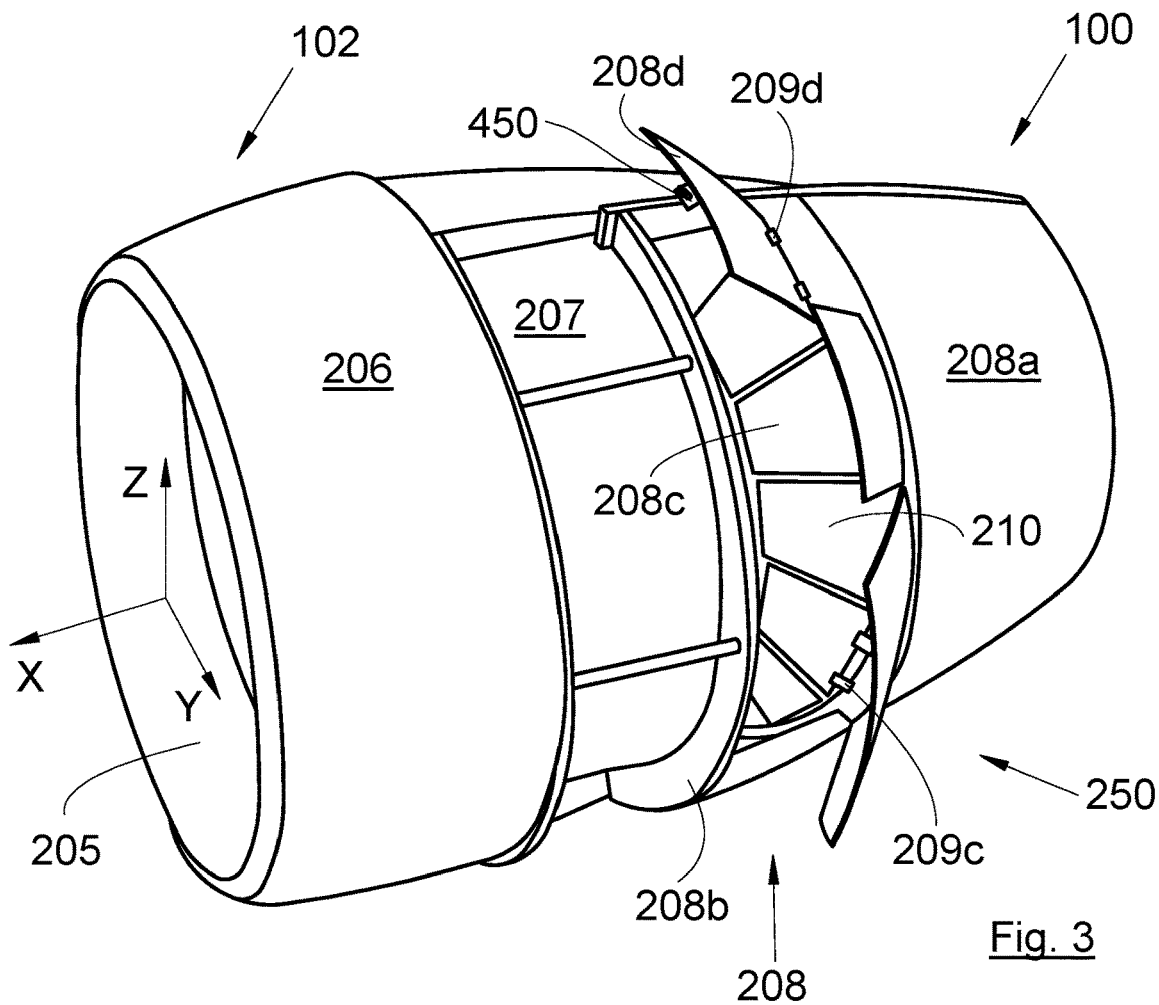
FIG. 3 is a perspective view of the dual flow jet engine of FIG. 2 when the thrust-reversing system is activated.

FIGS. 2 and 3 show the dual flow jet engine 100 according to the invention.

The dual flow jet engine 100 has a nacelle 102, an engine which is housed inside the nacelle 102 in the form of a core. The nacelle 102 has a fan casing 206 arranged at the front of the nacelle 102.

The nacelle 102 comprises a thrust-reversing system 250 which is retracted in FIG. 2 and deployed in FIG. 3.

The dual flow jet engine 100 has, between the nacelle 102 and the engine, a secondary jet in which circulates a secondary flow originating from the air inlet 205 through a fan and which therefore flows in a direction of flow which goes from the front to the rear of the aircraft 10.

The nacelle 102 has a fixed structure 207 which is fixedly mounted on the fan casing 206.

The thrust-reversing system 250 has a mobile assembly 208 which comprises a mobile cowl 208a forming the walls of the jet nozzle and a frame 208b. The frame 208b here takes the form of a cylinder with openwork walls. The mobile cowl 208a is fixed to the frame 208b.

There are two mobile cowls 208a arranged on either side of a median plane of the dual flow jet engine 100, each constituting an outer cowl of the nacelle 102 and they form, globally, a cylinder which constitutes the outer wall of the secondary jet.

The mobile assembly 208, via the frame 208b, is mounted to be translationally mobile in a direction of translation that is globally parallel to the longitudinal axis X on the fixed structure 207 of the nacelle 102.

The translation of the frame 208b, and therefore of the mobile assembly 208, is performed by any appropriate system of runners such as, for example, runners between the fixed structure 207 and the frame 208b. Similarly, a first mechanical transmission system of the thrust-reversing system 250 is fixed to the fixed structure 207 to displace the frame 208b. The first mechanical transmission system comprises, for example, actuators such as power cylinders, motors, racks, etc. The first mechanical transmission system is controlled by a control unit of the aircraft 10 and is not described in more detail, because it can take different forms that are within the scope of the person skilled in the art.

The mobile assembly 208 also comprises thrust-reversing doors 208c-d which are mounted articulated on the frame 208b and which comprise, in the embodiment of the invention presented here inner doors 208c and outer doors 208d.

The doors 208c-d are arranged forward relative to the mobile cowl 208a.

In the embodiment of the invention presented here, each inner door 208c is mounted articulated on the frame 208b between a stowed position and a deployed position (FIG. 3) and vice-versa. The switch from the stowed position to the deployed position is performed by a rotation of the inner door 208c towards the interior of the jet engine 100.

Each inner door 208c is, here, articulated by a rear edge on the frame 208b by hinges 209c fixed to the frame 208b whereas the opposite free edge is positioned towards the front in stowed position and across the secondary jet and towards the engine in deployed position.

The outer doors 208d are arranged outside relative to the inner doors 208c. Each outer door 208d is mounted facing an inner door 208c and the facing outer door 208d and inner door 208c constitute a pair of doors. The thrust-reversing system 250 thus comprises a plurality of pairs of doors 208c-d.

Each outer door 208d is mounted articulated on the frame 208b between a stowed position (FIG. 2) and a deployed position (FIG. 3) and vice-versa. The switch from the stowed position to the deployed position is performed by a rotation of the outer door 208d towards the outside of the jet engine 100. When the inner doors 208c and the outer doors 208d are deployed, they globally form a continuity which makes it possible to deflect the secondary jet towards the outside and the front of the nacelle 102.

Each outer door 208d is articulated by a rear edge on the frame 208b by hinges 209d fixed to the frame 208b whereas the opposite free edge is positioned towards the front in stowed position and towards the outside in deployed position.

In stowed position, the outer doors 208d are arranged between the mobile cowl 208a and the fan casing 206, so as to constitute an outer wall of the nacelle 102 which is therefore in contact with the flow of air which flows around the nacelle 102.

The switching of each door 208c-d from the stowed position to the deployed position and vice-versa is ensured by a second mechanical transmission system of the thrust-reversing system 250, comprising, for example, a motor, a power cylinder, a rack system, etc. The second mechanical transmission system is controlled by a control unit of the aircraft 10 and is not described in more detail, because it can take different forms that are within the scope of the person skilled in the art.

The mobile assembly 208, and therefore the frame 208b, is mobile between an advanced position (FIG. 2) and a retracted position (FIG. 3) and vice-versa. In advanced position, the mobile assembly 208, and therefore the frame 208b, is positioned as far forward as possible so that the outer doors 208d, which are in stowed position, are close to the fan casing 206. In retracted position, the mobile assembly 208, and therefore the frame 208b, is positioned as far back as possible so that the outer doors 208d are away from the fan casing 206.

In advanced position, the outer doors 208d extend the fan casing 206 towards the rear and, likewise, the mobile cowl 208a extends the outer doors 208d towards the rear.

The stowed position of the doors 208c-d can be adopted when the frame 208b is in advanced position or in retracted position. The deployed position of the doors 208c-d can be adopted only when the frame 208b is in retracted position.

The switch from the advanced position of the frame 208b to the retracted position of the frame 208b and deployed position of the doors 208c-d consist therefore, from the advanced position of the frame 208b and therefore from the stowed positions of the doors 208c-d, in activating the first mechanical transmission system to retract the frame 208b by translation relative to the fixed structure 207 to reach the retracted position for the frame 208b and the stowed positions of the doors 208c-d, then in activating each second mechanical transmission system to displace each door 208c-d from the stowed position to the deployed position.

The reverse displacement makes it possible to revert to the stowed and advanced position.

The nacelle 102 has a window 210 that is open between the secondary jet and the outside of the nacelle 102 and which is delimited here at the front by the fixed structure 207 and at the rear by the mobile cowl 208a. In stowed position, the doors 208c-d block the window 210 and in deployed position, the doors 208c-d do not block the window 210 and leave it free, that is to say, that the air from the secondary flow passes through the window 210 to rejoin the outside of the dual flow jet engine 100.

When the doors 208c-d are in deployed position, the secondary flow is deflected towards the outside of the nacelle 102 and towards the front making it possible to produce a counter-thrust.

Figure 4:
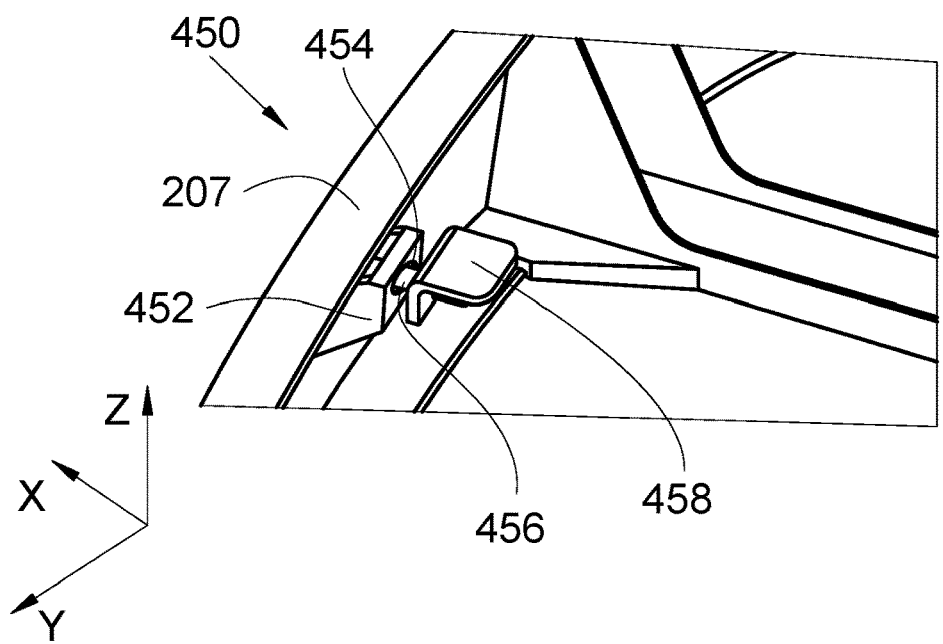
FIG. 4 is a perspective view of an anti-vibration system according to the invention mounted on an outer door.
Figure 5:
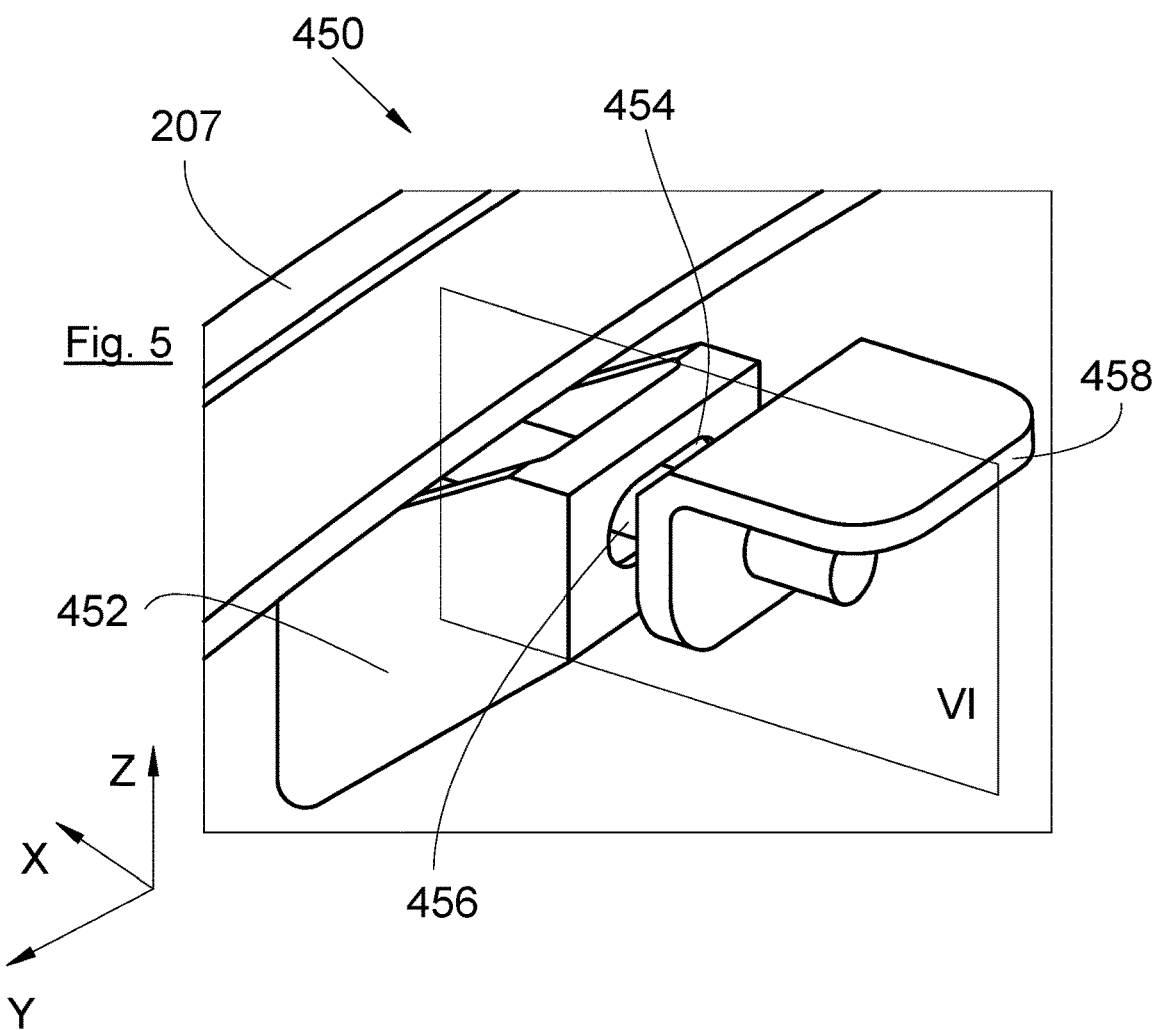
FIG. 5 is a perspective view of the anti-vibration system according to the invention.
Figure 6:
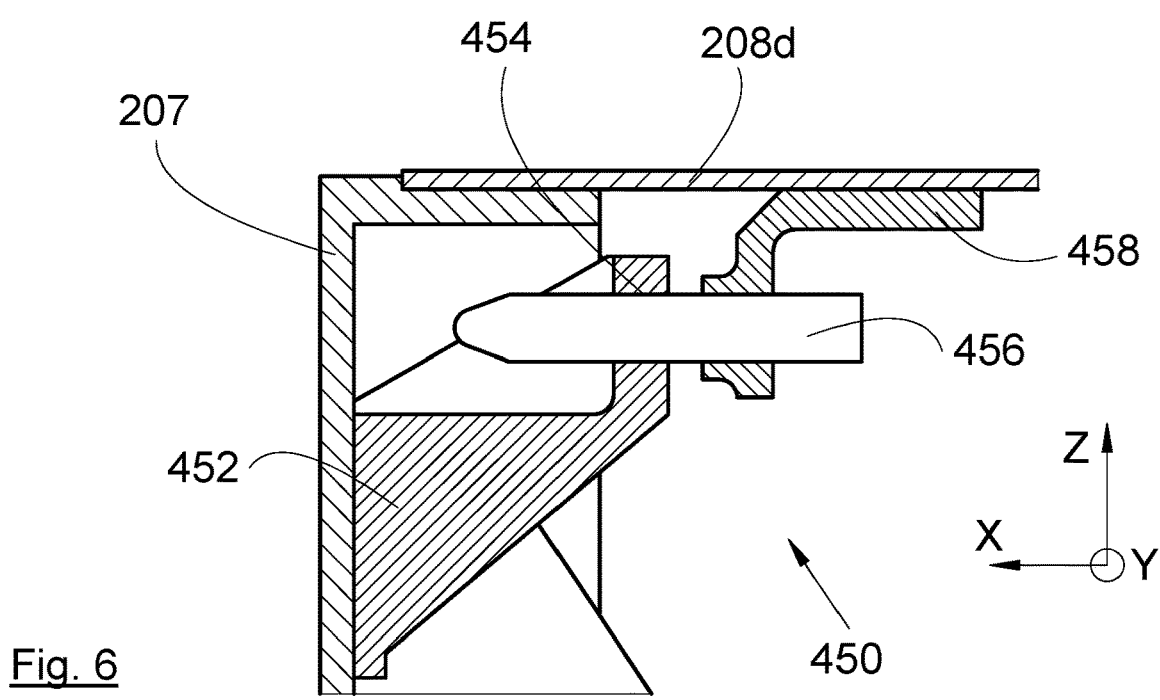
FIG. 6 is a cross-sectional view of the anti-vibration system along the plane VI of FIG. 5.

FIG. 4 shows a detail of the nacelle 102 which is enlarged in FIG. 5 and seen in cross-section in FIG. 6. FIG. 6 shows an outer door 208d in stowed position and this outer door 208d is not shown in FIGS. 4 and 5 to make it possible to see the anti-vibration system 450 according to the invention. FIGS. 4 to 6 show the nacelle 102 in advanced position of the mobile assembly 208.

The nacelle 102 here has an anti-vibration system 450 for each outer door 208d, but if the dimensions of the outer door 208d are too great, it is possible to place several anti-vibration systems 450.

The anti-vibration system 450 blocks the vibrations of the outer door 208d when the mobile assembly 208, and therefore the frame 208b, is in advanced position and the outer door 208d is in stowed position.

The anti-vibration system 450 comprises a chock 452 fixed to the fixed structure 207 and has a hole 454 whose axis is parallel to the direction of translation, that is to say globally parallel to the longitudinal axis X.

The anti-vibration system 450 also comprises a finger 456 whose axis is also parallel to the direction of translation and which is fixed to the outer door 208d, here via a bracket 458.

The finger 456 and the hole 454 are configured so that the finger 456 lodges in the hole 454 when the mobile assembly 208, and therefore the frame 208b, is in advanced position, so that the finger 456 exits from the hole 454 when the mobile assembly 208, and therefore the frame 208b, leaves the advanced position, and so that the finger 456 enters into the hole 454 when the mobile assembly 208, and therefore the frame 208b, goes back to the advanced position from the retracted position.

Obviously, it is possible to provide for the chock 452 to be fixed to the outer door 208d and for the finger 456 to be fixed to the fixed structure 207.

Such an anti-vibration system 450 also makes it possible to guarantee that the outer door 208d remains in stowed position when the frame 208b is in advanced position, thus constituting a kind of locking system.

The dimensions of the hole 454 and of the finger 456 in a radial direction of the nacelle 102, represented, for example, by the vertical axis Z in FIG. 6, are fitted with a sliding-type fit, so as to guarantee a good positioning of the outer door 208d relative to the fixed structure 207 in stowed and advanced position and thus guarantee the plays between these two elements in flight.

The entry of the finger 456 into the hole 454 is facilitated by the pointed form of the end of the finger 456 which enters into the hole 454.

To allow a certain angular clearance of the outer doors 208d, when the frame 208b reverts to advanced position, the dimension of the hole 454 in a globally tangential direction relative to the nacelle 102, that is to say, at right angles to the direction of translation and to the radial direction of the nacelle 102, is great relative to the dimension of the finger 456 in the same direction. Here, the hole 454 takes the form of an oblong hole.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A nacelle for a dual flow jet engine having a secondary jet, said nacelle having a window that is open between the secondary jet and the outside of the nacelle and comprising:
    a fan casing,
    a fixed structure fixed to the fan casing, and
    a thrust-reversing system having a frame and outer doors articulated by a rear edge on the frame,
        the frame being translationally mobile on the fixed structure in a direction of translation between an advanced position in which the frame is positioned so that the outer doors are close to the fan casing and a retracted position in which the frame is positioned so that the outer doors are away from the fan casing,
        each outer door being mobile between a stowed position in which it blocks the window and a deployed position in which it does not block the window,
        each outer door comprising at least one anti-vibration system comprising:
            a chock fixed to one or an other of the fixed structure or the outer door and having a hole with an axis parallel to the direction of translation,
            a finger having an axis parallel to the direction of translation and which is fixed to the other of the outer door or the fixed structure, and
            wherein the finger and the hole are configured so that the finger lodges in the hole when the frame is in the advanced position, so that the finger exits from the hole when the frame leaves the advanced position, and so that the finger enters into the hole when the frame goes back to the advanced position from the retracted position.

2. The nacelle according to claim 1, wherein dimensions of the hole and of the finger in a radial direction of the nacelle are fitted with a sliding-type fit.

3. The nacelle according to claim 1, wherein the hole is oblong in a globally tangential direction relative to the nacelle.

4. A dual flow jet engine comprising a core engine and a nacelle according to claim 1 and which surrounds the core engine and defines with the core engine the secondary jet.

5. An aircraft comprising at least one dual flow jet engine according to claim 4.

6. A nacelle for a dual flow jet engine having a secondary jet, said nacelle having a window open between the secondary jet and an outside of the nacelle and comprising:
   a fan casing,
   a fixed structure extending rearwardly of and fixed to the fan casing, and
   a thrust-reversing system having a frame and at least one outer door articulated at a rear edge on the frame,
      the frame being translationally mobile on the fixed structure in a direction of translation between an advanced position in which the frame is positioned so that a forward edge of the at least one outer door is close to the fan casing and a retracted position in which the frame is positioned so that the forward edge of the at least one outer door is spaced away from the fan casing and the frame extending at least over a portion of the window,
      each outer door being mobile between a forward stowed position in which the outer door blocks the window and a rearward deployed position in which the outer door does not block the window,
      each outer door comprising at least one anti-vibration system comprising:
         a chock fixed to one of either the fixed structure or the outer door and having a hole with an axis parallel to the direction of translation,
         a finger having an axis parallel to the direction of translation, which is fixed to an other of the outer door or the fixed structure, and which is sized to be received in the hole, and
         the finger and the hole being configured and aligned so that the finger is positioned in the hole when the frame is in the advanced position, so that the finger exits from the hole when the frame leaves the advanced position, and so that the finger enters into and is positioned in the hole when the frame returns to the advanced position from the retracted position.

7. The nacelle according to claim 6, wherein dimensions of the hole and the finger in a radial direction of the nacelle are such that the finger has a sliding-type fit within the hole.

8. The nacelle according to claim 6, wherein the hole is oblong in an angular direction relative to a longitudinally axial direction of the nacelle.

9. A dual flow jet engine comprising a core engine defining a primary jet and the nacelle according to claim 6 which surrounds the core engine and defines with the engine the secondary jet.

10. An aircraft comprising at least one dual flow jet engine according to claim 9.

* * * * *